United States Patent
Matsuda et al.

(10) Patent No.: US 10,755,462 B2
(45) Date of Patent: Aug. 25, 2020

(54) ELECTRONIC DEVICE

(71) Applicant: CANON KABUSHIKI KAISHA, Tokyo (JP)

(72) Inventors: Araki Matsuda, Kawasaki (JP); Kozue Kozakura, Yokohama (JP); Hiroyuki Owatari, Saitama (JP); Asami Takenaga, Tokyo (JP); Yumiko Kuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/286,742

(22) Filed: Feb. 27, 2019

(65) Prior Publication Data
US 2019/0272657 A1    Sep. 5, 2019

(30) Foreign Application Priority Data

Mar. 1, 2018  (JP) ................................. 2018-036329

(51) Int. Cl.
*G06T 3/40* (2006.01)
*G06T 11/60* (2006.01)
*G06F 3/0484* (2013.01)
*G06F 3/0485* (2013.01)

(52) U.S. Cl.
CPC ............ *G06T 11/60* (2013.01); *G06F 3/0485* (2013.01); *G06F 3/04845* (2013.01); *G06T 3/40* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 8,132,116 B1 * | 3/2012 | Schendel | ............ | G06F 3/04817 715/764 |
| 2013/0207999 A1 * | 8/2013 | Hagiwara | ............... | G06F 16/54 345/619 |

FOREIGN PATENT DOCUMENTS

JP    2010-118887 A    5/2010

* cited by examiner

*Primary Examiner* — Nicholas R Wilson
(74) *Attorney, Agent, or Firm* — Cowan, Liebowitz & Latman, P.C.

(57) ABSTRACT

An electronic device: calculates, for each image, length of a side in a first direction when resizing length of a side in a second direction to a specific length; arranges images such that the number of images arranged in the first direction is not more than a threshold number and a total of lengths of sides in the first direction of the images arranged in the first direction is not more than a threshold length; executes, for each image, resize processing for resizing the images arranged in the first direction such that the total of the lengths is approximated to the threshold length and lengths of sides in the second direction of the images arranged in the first direction are approximated; and displays the images, on which the resize processing is executed, in the display area side by side in the first and second directions.

14 Claims, 9 Drawing Sheets

FIG. 8D
RESIZE IMAGES TO FIT WIDTH OF SCREEN

FIG. 8C
ALLOCATE IMAGES TO ROWS

ELECTRONIC DEVICE

BACKGROUND OF THE INVENTION

Field of the Invention

The present invention relates to an electronic device that performs display control of images.

Description of the Related Art

There is a function of respectively reducing a plurality of images and displaying the plurality of reduced images side by side (list display of images) as a function in operating systems and applications executed in personal computers, smartphones, digital cameras, and the like. A technique concerning the list display of images is disclosed in, for example, Japanese Patent Application Publication No. 2010-118887.

SUMMARY OF THE INVENTION

In the list display of images, when reduced images are generated and displayed to maintain aspect ratios of the images, the display size of the images is sometimes excessively large or excessively small. As an example, it is assumed that an area where one reduced image is displayed is a predetermined area independent of an image. When the area is a laterally long area, a longitudinally long image is displayed in a display size relatively smaller than a laterally long image.

The present invention provides a technique that can prevent, in the list display of images, the display size of the images from becoming excessively large or excessively small.

The present invention in its first aspect provides an electronic device capable of performing control such that a plurality of images are displayed in a display area side by side in a first direction and a second direction different from each other, the electronic device comprising:

a processor; and a memory storing a program which, when executed by the processor, causes the electronic device to:

calculate, for each of the plurality of images, length of a side in the first direction resized in order to maintain an aspect ratio when resizing length of a side in the second direction to a specific length;

arrange the plurality of images in the first direction and the second direction such that the number of images arranged side by side in the first direction is not more than a threshold number and a total of lengths of sides in the first direction of the images arranged side by side in the first direction is not more than a threshold length;

execute, for each of the images arranged side by side in the first direction, resize processing for resizing the images arranged side by side in the first direction such that the total of the lengths of the sides in the first direction of the images arranged side by side in the first direction is approximated to the threshold length and lengths of sides in the second direction of the images arranged side by side in the first direction are approximated; and display the images, on which the resize processing is executed, in the display area side by side in the first direction and the second direction.

The present invention in its second aspect provides a display control method for displaying a plurality of images in a display area side by side in a first direction and a second direction different from each other, the display control method comprising:

calculating, for each of the plurality of images, length of a side in the first direction resized in order to maintain an aspect ratio when resizing length of a side in the second direction to a specific length;

arranging the plurality of images in the first direction and the second direction such that the number of images arranged side by side in the first direction is not more than a threshold number and a total of lengths of sides in the first direction of the images arranged side by side in the first direction is not more than a threshold length;

executing, for each of the images arranged side by side in the first direction, resize processing for resizing the images arranged side by side in the first direction such that the total of the lengths of the sides in the first direction of the images arranged side by side in the first direction is approximated to the threshold length and lengths of sides in the second direction of the images arranged side by side in the first direction are approximated; and displaying the images, on which the resize processing is executed, in the display area side by side in the first direction and the second direction.

The present invention in its third aspect provides a non-transitory computer readable medium that stores a program, wherein the program causes a computer to execute:

calculating, for each of a plurality of images which are to be displayed in a display area side by side in a first direction and a second direction different from each other, length of a side in the first direction resized in order to maintain an aspect ratio when resizing length of a side in the second direction to a specific length;

arranging the plurality of images in the first direction and the second direction such that the number of images arranged side by side in the first direction is not more than a threshold number and a total of lengths of sides in the first direction of the images arranged side by side in the first direction is not more than a threshold length;

executing, for each of the images arranged side by side in the first direction, resize processing for resizing the images arranged side by side in the first direction such that the total of the lengths of the sides in the first direction of the images arranged side by side in the first direction is approximated to the threshold length and lengths of sides in the second direction of the images arranged side by side in the first direction are approximated; and displaying the images, on which the resize processing is executed, in the display area side by side in the first direction and the second direction.

According to the present invention, it is possible to prevent, in the list display of images, the display size of the images from becoming excessively large or excessively small.

Further features of the present invention will become apparent from the following description of exemplary embodiments with reference to the attached drawings.

DESCRIPTION OF THE EMBODIMENTS

Problem Examples to be Solved by Present Invention

Figure 1A:
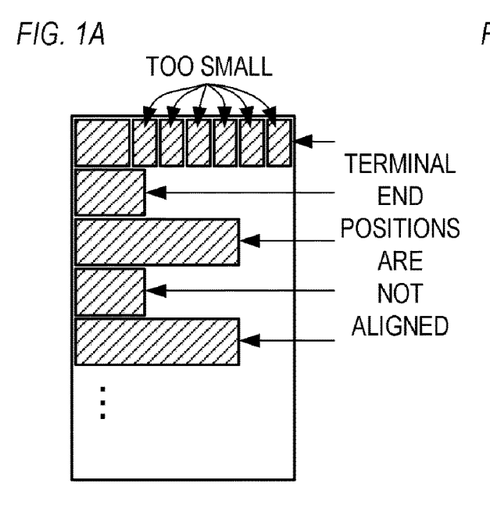
FIGS. 1A to 1E are diagrams showing examples of list display according to first and second embodiments.

Display shown in FIG. 1A is conceivable as list display of images (e.g., thumbnail display for displaying a plurality of thumbnail images side by side). In the display shown in FIG. 1A, aspect ratios (ratios of heights and widths) of the images are maintained. The height of the images is set as predetermined height. In each row, a total (a sum) of the widths of the images are set to not more than the width of a display area. However, in the display shown in FIG. 1A, terminal end positions of the images (the positions of the right ends of images present on the rightmost side) are different among a plurality of rows. Therefore, the appearance of the images is degraded.

It is also conceivable to adopt a method of adjusting display sizes of images such that a total of the widths of the images arranged side by side in the horizontal direction substantially coincides with the width of the display area (in this embodiment, "substantially" includes "completely"; a difference between comparison targets is within a predetermined range). With this method, list display shown in FIG. 1B can be realized. In the display shown in FIG. 1B, terminal end positions are equal among a plurality of rows.

Figure 1B:
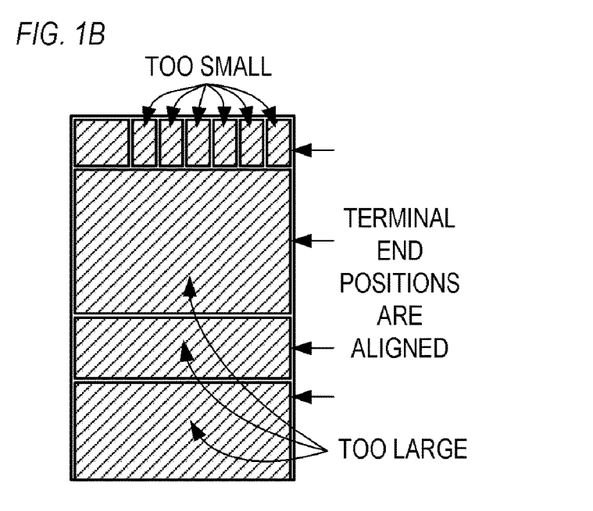

However, in both of the display shown in FIG. 1A and the display shown in FIG. 1B, a large number of (seven) images are arranged side by side in a first row. Therefore, longitudinally long images are displayed in display sizes excessively smaller than the display size of a laterally long image. The appearance of the images is degraded and visibility of the longitudinally long images is low. In the display shown in FIG. 1B, a laterally long image having excessively large width, images preceding and following the laterally long image, and the like are displayed in display sizes excessively large compared with the other images. Therefore, the appearance of the images is degraded.

In embodiments explained below, examples are explained in which it is possible to prevent, in list display of images, display sizes of the images from becoming excessively large or excessively small.

First Embodiment

A first embodiment of the present invention is explained. A display control apparatus (an electronic device) according to this embodiment controls list display of images to be performed. Specifically, the display control apparatus performs control such that a plurality of images are displayed in a display area side by side in a first direction and a second direction different from each other. The first direction and the second direction are not particularly limited. However, in this embodiment, it is assumed that the second direction is a direction substantially perpendicular to the first direction. Specifically, it is assumed that the first direction is the horizontal direction (the row direction; the width direction; or the left-right direction) and the second direction is the vertical direction (the column direction; the height direction; or the up-down direction). A size and a shape of the display area are not particularly limited. However, in this embodiment, the shape of the display area is a square. Scrolling can be performed in the second direction in response to operation of a user. A display target image can be changed and displayed in the display area according to the scrolling.

In this embodiment, the display control apparatus controls display to satisfy the following conditions. Consequently, it is possible to prevent display sizes of images from becoming excessively small. Details of such an effect are explained below. An interval or the like between images in the vertical direction is not particularly limited. However, in this embodiment, an example is explained in which a plurality of images are displayed side by side without gaps in the horizontal direction and the vertical direction.

- The number of images in the horizontal direction is not more than a threshold number.
- The heights of images are substantially equal among the images arranged side by side in the horizontal direction.
- Aspect ratios of images are substantially maintained.
- A total (a total size) of widths of images arranged side by side in the horizontal direction is substantially equal to the width of the display area.

Figure 2:
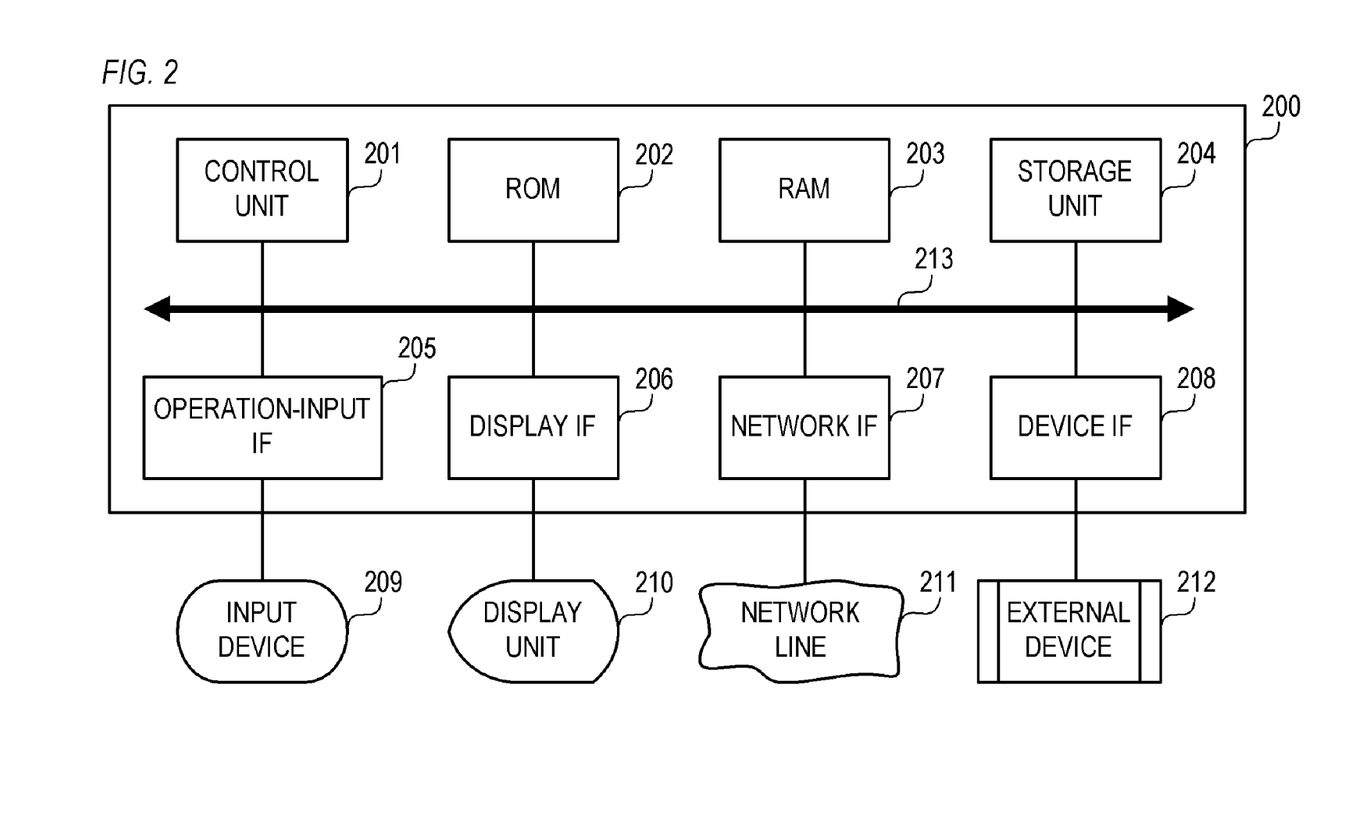
FIG. 2 is a block diagram showing a configuration example of a display control apparatus according to the first and second embodiments.

FIG. 2 is a block diagram showing a configuration example of a display control apparatus 200 according to this embodiment. The display control apparatus 200 includes a control unit 201, a ROM 202, a RAM 203, a storage unit 204, an operation-input IF 205, a display IF 206, a network IF 207, a device IF 208, and a system bus 213.

The control unit 201 controls the entire display control apparatus 200. For example, the control unit 201 is a central processing unit (CPU). The read only memory (ROM) 202 non-temporarily stores various data (programs, parameters, and the like). The random access memory (RAM) 203 temporarily stores various data. The storage unit 204 non-temporarily stores various data. As the storage unit 204, for example, a semiconductor memory (a memory card), a magnetic disk (a hard disk or a floppy disk), and an optical disk (a compact disk (CD), a digital versatile disc (DVD), or a Blu-ray disk) can be used. As the storage unit 204, a magnetic card, an optical card, an integrated circuit (IC) card, and the like can also be used. The storage unit 204 may be or may not be detachably attachable to the display control apparatus 200.

The operation-input IF 205 is an interface with an input device 209 that receives user operation. As the input device 209, for example, a physical button, a pointing device (a touch panel, a touch pad, a mouse, or the like), and a keyboard can be used. The display IF 206 is an interface with a display unit (a display apparatus) 210 that displays various images. As the display unit 210, for example, a liquid crystal panel and a backlight module and an organic electro-luminescence (EL) panel can be used. The input device 209, a display unit 210, and the like may be or may not be detachably attachable to the display control apparatus 200. For example, the display control apparatus 200 may be a smartphone terminal, and a touch screen obtained by integrating the input device 209 and the display unit 210 may be used.

The network IF 207 is an interface for connecting the display control apparatus 200 to a network line 211 such as the Internet. The device IF 208 is an interface for communication with an external device (an external apparatus) 212 such as an imaging apparatus.

The system bus 213 is a bus that communicably connect the control unit 201, the ROM 202, the RAM 203, the storage unit 204, the operation-input IF 205, the display IF 206, the network IF 207, and the device IF 208.

Figure 3:
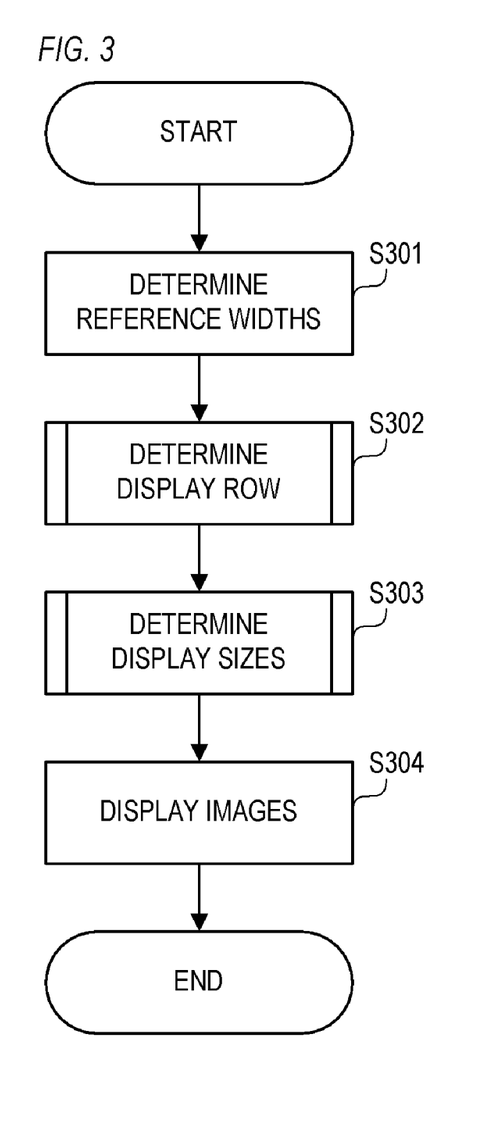
FIG. 3 is a flowchart showing a processing flow example according to the first and second embodiments.

FIG. 3 is a flowchart showing a processing flow example in which the display control apparatus 200 performs list display of images. The processing flow of FIG. 3 is performed, for example, according to user operation that instructs execution of the list display.

Figure 8A:
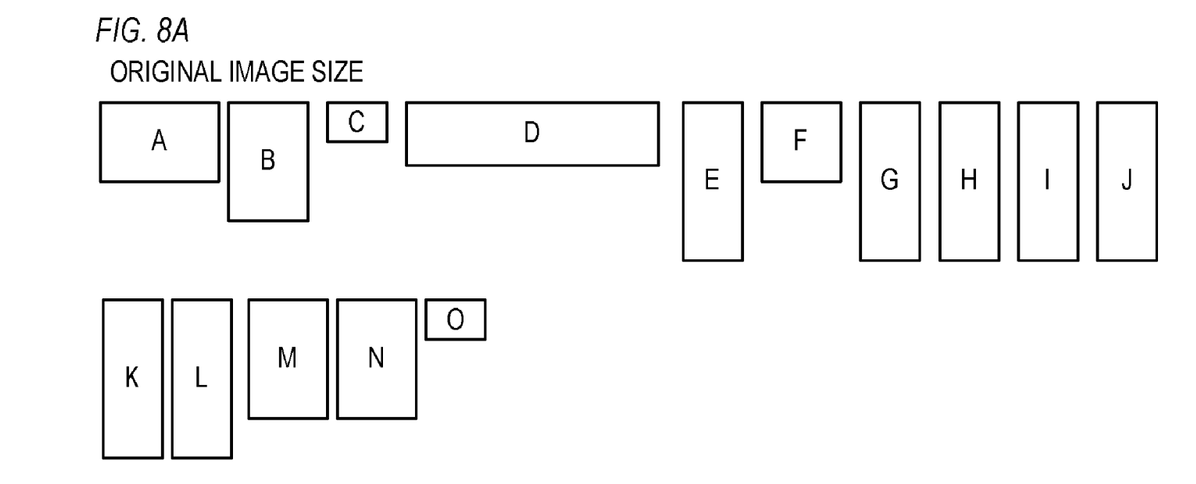
FIGS. 8A to 8D are diagrams showing examples of images according to the first embodiment.
Figure 8B:
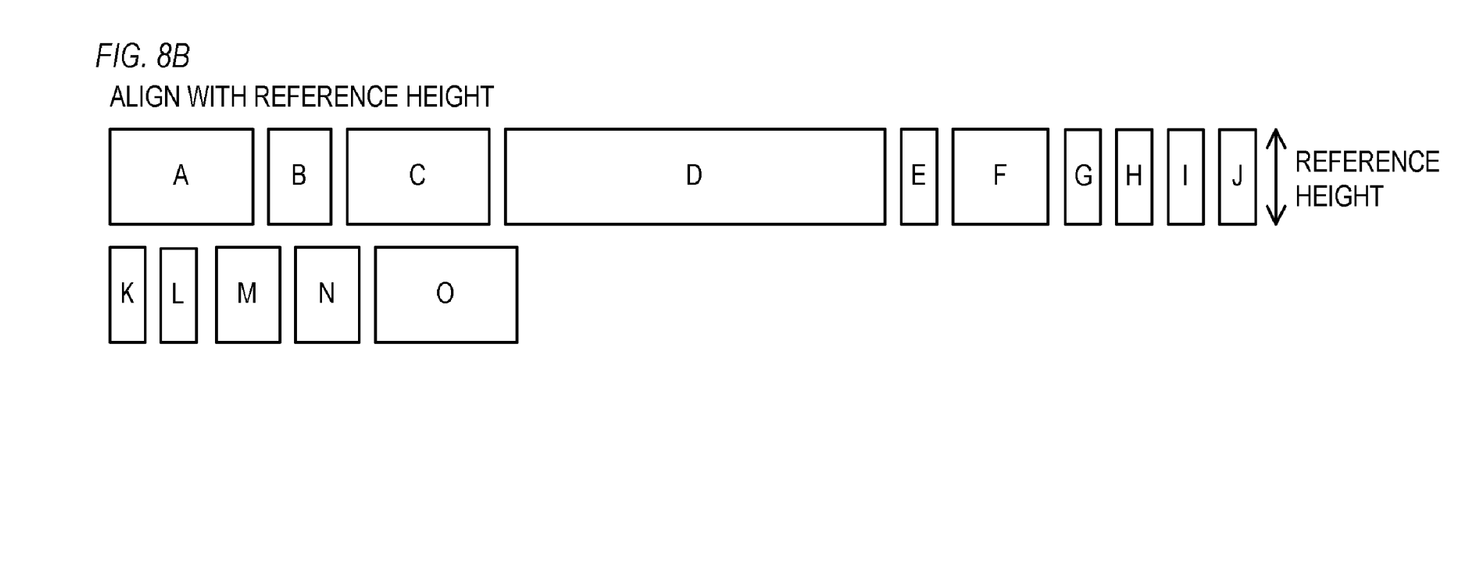

In step S301, the control unit 201 determines, concerning images, reference widths (reference sizes), which are widths of the images at the time when aspect ratios of the image are substantially maintained and the heights of the images are set to a specific height (a specific size). Specifically, the control unit 201 calculates, concerning the images, magnifications (reduction ratios and enlargement ratios) for setting the heights to the specific height and multiplies the widths of the images by the calculated magnifications to thereby calculate the reference widths. The specific height is common to all the images. According to the processing in step S301, for example, for images having different aspect ratios shown in FIG. 8A, sizes (heights and widths) of the images shown in FIG. 8B are determined.

Figure 8C:
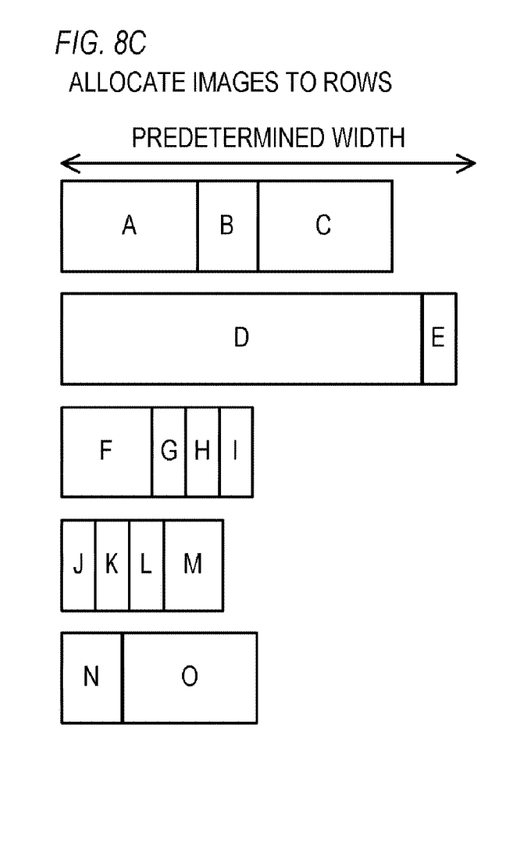

In step S302, the control unit 201 determines disposition (a display row; a row in which the images are displayed) of the images such that a total of reference widths of images arranged side by side in the horizontal direction is not more than the width of the display area. In this embodiment, as shown in FIG. 8C, the control unit 201 determines the disposition of the images such that the total of the reference widths of the images arranged side by side in the horizontal direction is not more than the width of the display area and the number of images in the horizontal direction is not more than a threshold number. Details of the processing in step S302 are explained below.

Figure 8D:
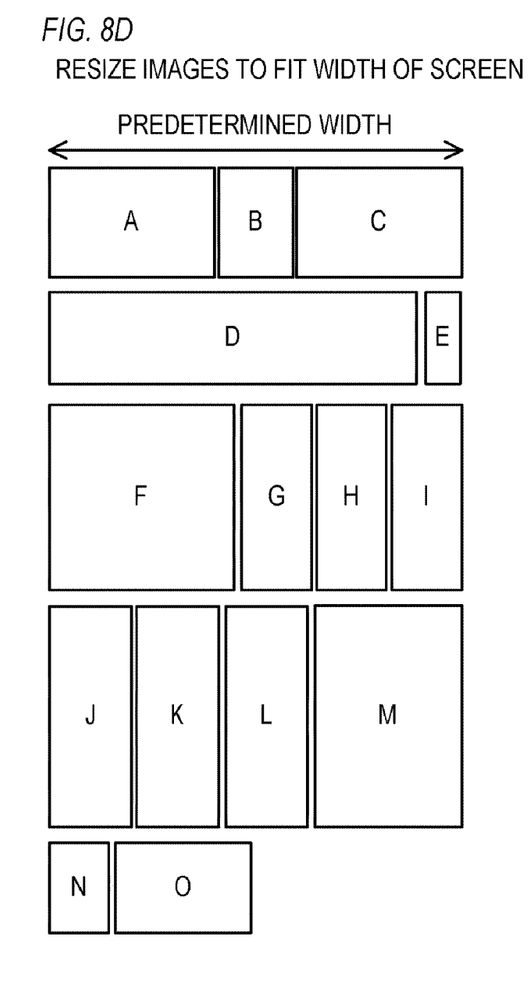

In step S303, as shown in FIG. 8D, the control unit 201 determines display sizes of the images such that aspect ratios of the images are substantially maintained and a total of the widths of the images arranged side by side in the horizontal direction is substantially equal to the width of the display area. Details of the processing in step S303 are explained below.

In step S304, the control unit 201 controls the images to be displayed in the display area of the display unit 210 according to the disposition determined in step S302 and the display sizes determined in step S303. The display area may be an entire display surface of the display unit 210 or may be a part of the display surface.

Figure 4:
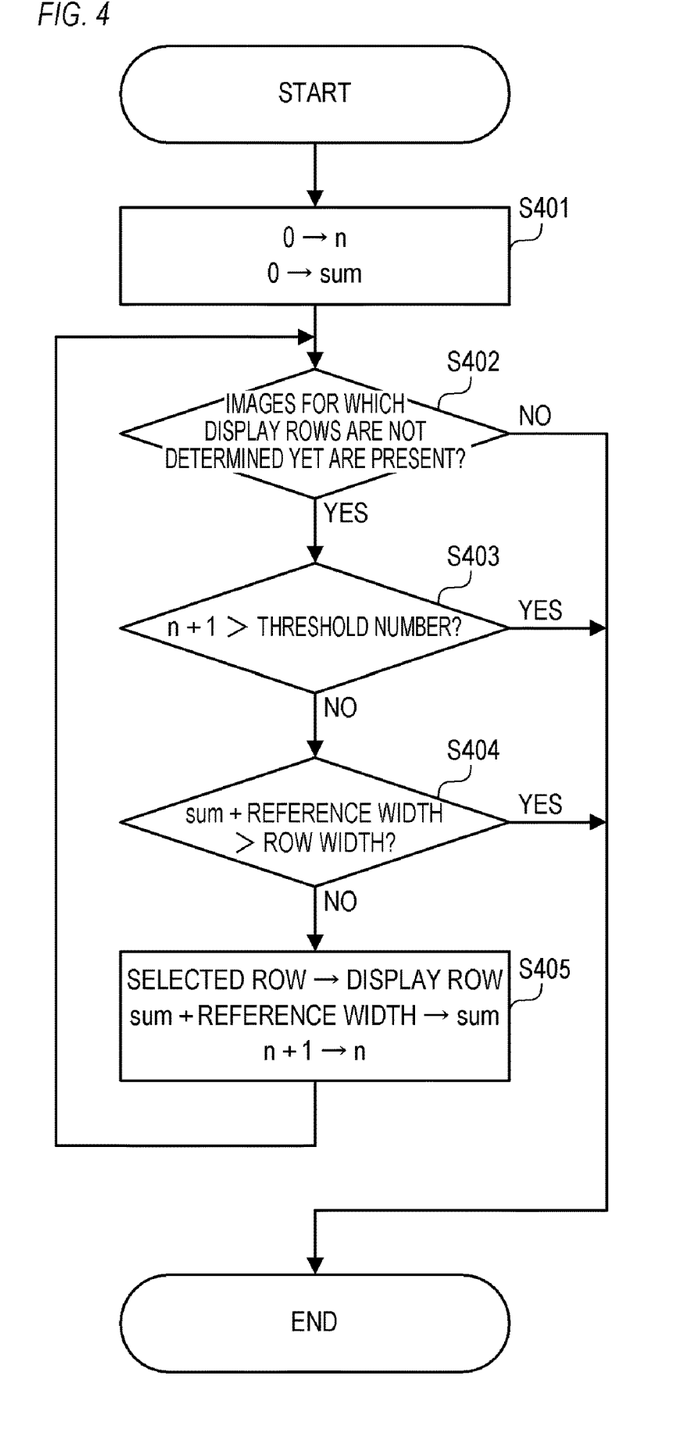
FIG. 4 is a flowchart showing a processing flow example according to the first embodiment.

FIG. 4 is a flowchart showing a processing flow example in step S302 of FIG. 3. The control unit 201 selects rows in order from the upper side of the display area and performs the processing flow of FIG. 4 concerning the rows until disposition of all the images is determined.

In step S401, the control unit 201 initializes variables "n" and "sum" to 0. The variable "n" represents the number of images arranged in a selected row. The variable "sum" represents a total of reference widths of the images arranged in the selected row.

In step S402, the control unit 201 determines whether images for which display rows are not determined yet are present. When determining that images for which display rows are not determined yet are present, the control unit 201 selects, as a processing target image, one image for which a display row is not determined yet and advances the processing to step S403. When determining that images for which display rows are not determined yet are absent, the control unit 201 ends this processing flow and advances the processing to step S303 of FIG. 3.

In step S403, the control unit 201 determines whether the number of images obtained by adding 1 to the variable "n" is larger than the threshold number. When determining that the number of images n+1 is larger than the threshold number, the control unit 201 ends this processing flow, selects the next row, and executes this processing flow again. When determining that the number of images n+1 is not more than the threshold number, the control unit 201 advances the processing to step S404. The threshold number is common to all rows.

In step S404, the control unit 201 determines whether a cumulative width obtained by adding the reference width (the reference width determined in step S301) of the processing target image to the variable "sum" is larger than the width of the selected row (the width of the display area). When determining that the cumulative width is larger than the width of the selected row, the control unit 201 ends this processing flow, selects the next row, and executes this processing flow again. When determining that the cumulative width is not more than the width of the selected row, the control unit 201 advances the processing to step S405.

In step S405, the control unit 201 determines the selected row as a display row of the processing target image. The control unit 201 updates the variable "n" to the number of images obtained by adding 1 to the variable "n" and updates the variable "sum" to a cumulative width obtained by adding the reference width of the processing target image to the variable "sum". The control unit 201 returns the processing to step S402.

Figure 5:
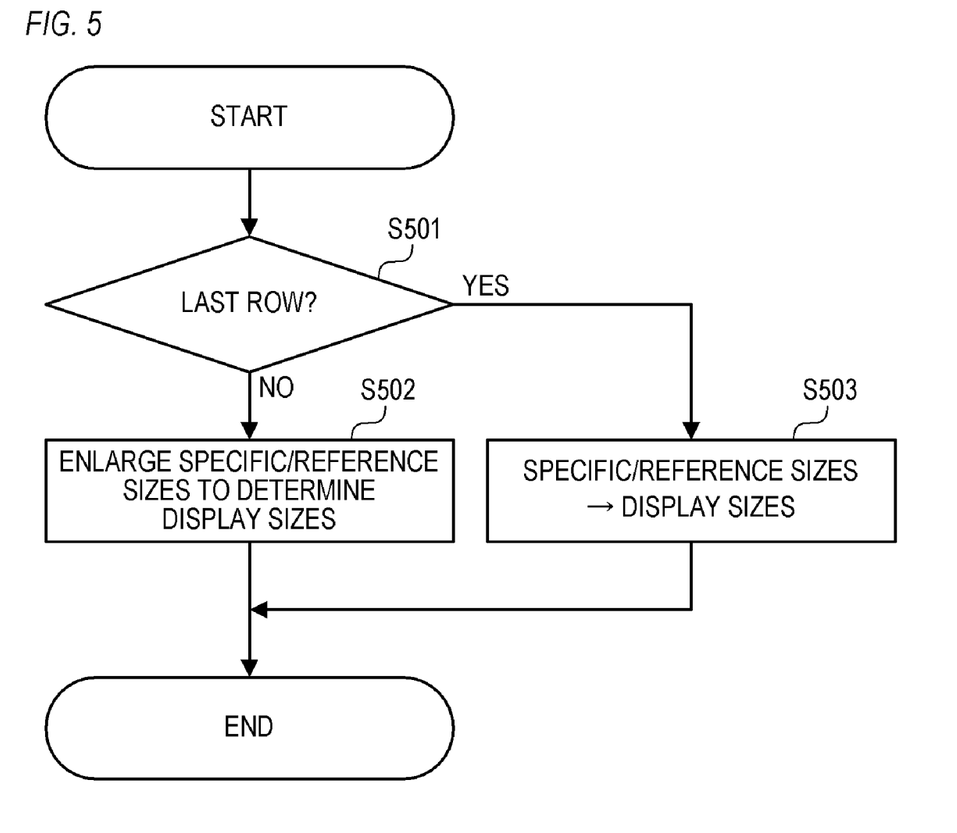
FIG. 5 is a flowchart showing a processing flow example according to the first and second embodiments.

FIG. 5 is a flowchart showing a processing flow example in step S303 of FIG. 3. The control unit 201 selects display rows (the display row determined in step S302) in order from the upper side of the display area and performs the processing flow of FIG. 5 concerning the display rows.

In step S501, the control unit 201 determines whether the selected display row is the last row. When determining that the selected display row is not the last row, the control unit 201 advances the processing to step S502. When determining that the selected display row is the last row, the control unit 201 advances the processing to step S503.

In step S502, the control unit 201 determines display sizes of images arranged in the selected display row such that aspect ratios of the images are substantially maintained and a total of the widths of the images arranged in the selected display row is substantially equal to the width of the display area. Specifically, the control unit 201 divides the width of the display area by a total of reference widths (the reference widths determined in step S301) of the images arranged in the selected display row to thereby calculate an enlargement ratio of the images. The enlargement ratio is common to all the images arranged in the selected display row. The control unit 201 multiplies specific/reference sizes (specific heights and reference widths) of the images arranged in the selected display row by the enlargement ratio to thereby calculate display sizes of the images. With the processing in step S502, it is possible to prevent unnecessary regions from being formed among the images arranged in the selected display row. When the processing in step S502 is performed, this processing flow is ended, the next display row is selected, and this processing flow is executed again.

In step S503, the control unit 201 determines (adopts) the specific/reference sizes as display sizes of the images arranged in the selected display row. The number of images arranged in the last row is sometimes small. When the processing in step S502 is performed, excessively large display sizes are sometimes determined in the last row in which the number of arranged images is small. In this embodiment, with the processing in step S503, it is possible to prevent excessively large display sizes from being determined in the last row.

Figure 1C:
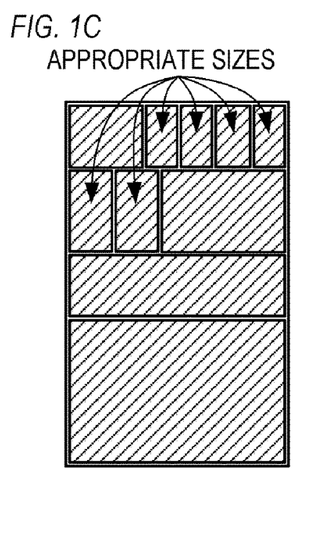

With the processing flow of FIGS. 3 to 5, for example, list display shown in FIG. 1C can be realized. FIG. 1C shows an example in which the threshold number is five. In FIGS. 1A and 1B, seven images are arranged side by side in the first row. The longitudinally long images are displayed in an excessively small display size. In this example, the numbers of images in the rows are limited to the threshold number (five). Therefore, as shown in FIG. 1C, the longitudinally long images can also be displayed in appropriate display sizes. The appearance of the images and the visibility of the longitudinally long images can be improved. In this way, according to this embodiment, it is possible to prevent, in the list display of images, display sizes of the images from becoming excessively small.

The threshold number may be a fixed number decided in advance by a manufacturer or may be determined and changed by the control unit 201. A method of determining the threshold number is not particularly limited. The threshold number only has to be determined before the processing in step S302 of FIG. 3 is started. Similarly, the specific height may be a fixed height decided in advance by the manufacturer or may be determined and changed by the control unit 201. A method of determining the specific height is not particularly limited.

For example, the control unit 201 may determine the threshold number on the basis of the reference widths of the images. Specifically, the control unit 201 may divide the width of the display area by an average of the reference widths of the images to thereby calculate the threshold number.

The control unit 201 may determine the threshold number and the specific height according to user operation. The user operation may be or may not be operation for designating the threshold number and the specific height. For example, the user operation may be operation for designating relative display sizes ("large", "medium", "small", and the like) of the images. In that case, the control unit 201 determines a smaller threshold number as the designated display sizes are larger or determines a smaller specific height as the designated display sizes are larger.

Second Embodiment

A second embodiment of the present invention is explained. In the following explanation, differences from the first embodiment (components and processing different from those in the first embodiment) are explained in detail. Explanation of similarities to the first embodiment is omitted. In this embodiment, a display control apparatus controls display satisfying the following conditions to be performed. Consequently, it is possible to prevent display sizes of images from becoming excessively large. Details of such an effect are explained below.

A margin is added to an image, a reference width of which is larger than a threshold width, such that the reference width is not more than the threshold width (not more than a threshold size).

The heights of images are substantially equal among the images arranged side by side in the horizontal direction.

Aspect ratios of the images are substantially maintained.

A total of the widths of the images arranged side by side in the horizontal direction is substantially equal to the width of a display area.

Figure 6:
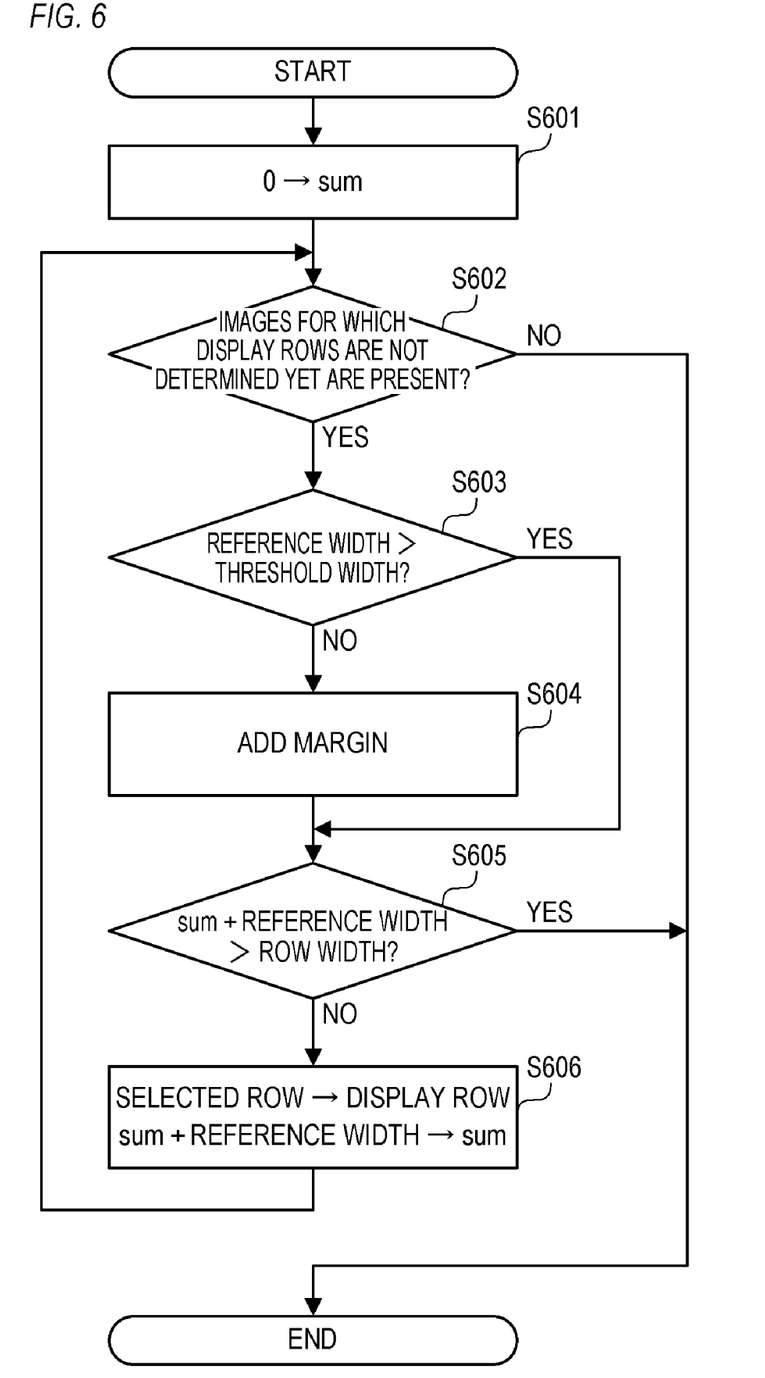
FIG. 6 is a flowchart showing a processing flow example according to the second embodiment.

FIG. 6 is a flowchart showing a processing flow example in step S302 of FIG. 3. The control unit 201 selects rows in order from the upper side of the display area and performs the processing flow of FIG. 6 concerning the rows until disposition of all the images is determined.

In step S601, the control unit 201 initializes the variable "sum" to 0.

In step S602, the control unit 201 determines whether images for which display rows are not determined yet are present. When determining that the images for which display rows are not determined yet are present, the control unit 201 selects, as a processing target image, one image for which a display row is not determined yet and advances the processing to step S603. When determining that images for which display rows are not determined yet are absent, the control unit 201 ends this processing flow and advances the processing to step S303 of FIG. 3.

In step S603, the control unit 201 determines whether a reference width (the reference width determined in step S301) of the processing target image is larger than the threshold width. When determining that the reference width of the processing target image is larger than the threshold width, the control unit 201 advances the processing to step S604. When determining that the reference width of the processing target image is not more than the threshold width, the control unit 201 advances the processing to step S605. The threshold width is common to all the images.

In step S604, the control unit 201 adds a margin (a black belt image; or an invalid image) to the processing target image such that the reference width is not more than the threshold width. Specifically, the control unit 201 adds margins above and below the processing target image such that the reference width coincides with the threshold width. With the processing in step S604, the reference width of the processing target image is updated from the reference width determined in step S301 to the reference width equal to the threshold width. When an aspect ratio of the processing target image is maintained and the width of the processing target image is reduced from the reference width, the height of the processing target image decreases from the specific height. The margin is added in order to prevent the height of the processing target image from decreasing from the specific height. A color of the margin is not limited to black. The margin may be an image including a pattern.

In step S605, the control unit 201 determines whether a cumulative width obtained by adding the reference width of the processing target image to the variable "sum" is larger than the width of the selected row (the width of the display area). When determining that the cumulative width is larger than the width of the selected row, the control unit 201 ends this processing flow, selects the next row, and executes this processing flow again. When determining that the cumulative width is not more than the width of the selected row, the control unit 201 advances the processing to step S606.

In step S606, the control unit 201 determines the selected row as a display row of the processing target image. The control unit 201 updates the variable "sum" to a cumulative width obtained by adding the reference width of the processing target image to the variable "sum". The control unit 201 returns the processing to step S602.

When the reference width is updated in step S605, the reference width (=the threshold width) after the update is used in steps S605 and S606. When the processing in step S605 is not performed, the reference width determined in step S301 is used in steps S605 and S606.

Figure 1D:
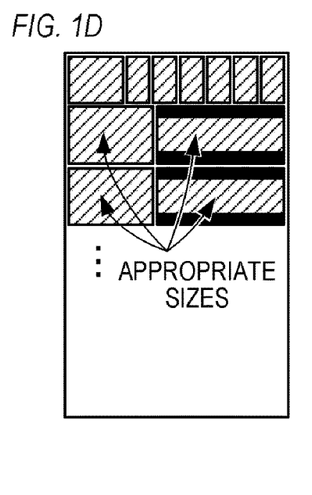

With the processing flows of FIGS. 3, 5, and 6, for example, list display shown in FIG. 1D can be realized. In FIGS. 1B and 1C, a laterally long image having excessively large width, images preceding and following the laterally long image, and the like are displayed in display sizes excessively large compared with the other images. In this embodiment, display widths of the images are limited. Therefore, as shown in FIG. 1D, a laterally long image having excessively large width can be displayed in an appropriate display size. The appearance of the images can be improved. Further, images preceding and following the laterally long image having excessively large width can also be displayed in the same row as the laterally long image. Therefore, the images preceding and following the laterally long image having excessively large width can also be displayed in appropriate display sizes. The appearance of the images can be improved. In this way, according to this embodiment, it is possible to prevent, in list display of images, display sizes of the images from becoming excessively large.

The threshold width may be a fixed width decided in advance by the manufacturer or may be determined and changed by the control unit 201. A method of determining the threshold width is not particularly limited. The threshold width only has to be determined before the processing in step S302 of FIG. 3 is started. Similarly, the specific height may be a fixed height decided in advance by the manufacturer or may be determined and changed by the control unit 201. A method of determining the specific height is not particularly limited.

For example, the control unit 201 may determine the threshold width on the basis of the reference widths (the reference widths determined in step S301) of the images. Specifically, the control unit 201 may multiply an average of the reference widths of the images by a predetermined value (2 or the like) to thereby calculate the threshold width.

The control unit 201 may determine the threshold width and the specific height according to user operation. The user operation may be or may not be operation for designating the threshold width and the specific height. For example, the user operation may be operation for designating relative display sizes ("large", "medium", "small", and the like) of the images. In that case, the control unit 201 determines a smaller threshold width as the designated display sizes are larger or determines a smaller specific height as the designated display sizes are larger.

The first and second embodiments are only examples. Configurations obtained by modifying and changing the configurations of the first and second embodiments as appropriate within the scope of the gist of the present invention are also included in the present invention. Configurations obtained by combining the configurations of the first and second embodiments as appropriate are also included in the present invention.

Figure 1E:
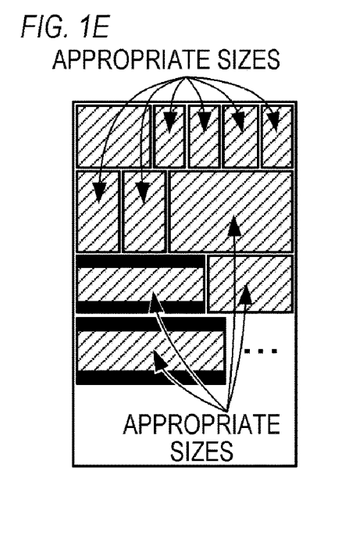
Figure 7:
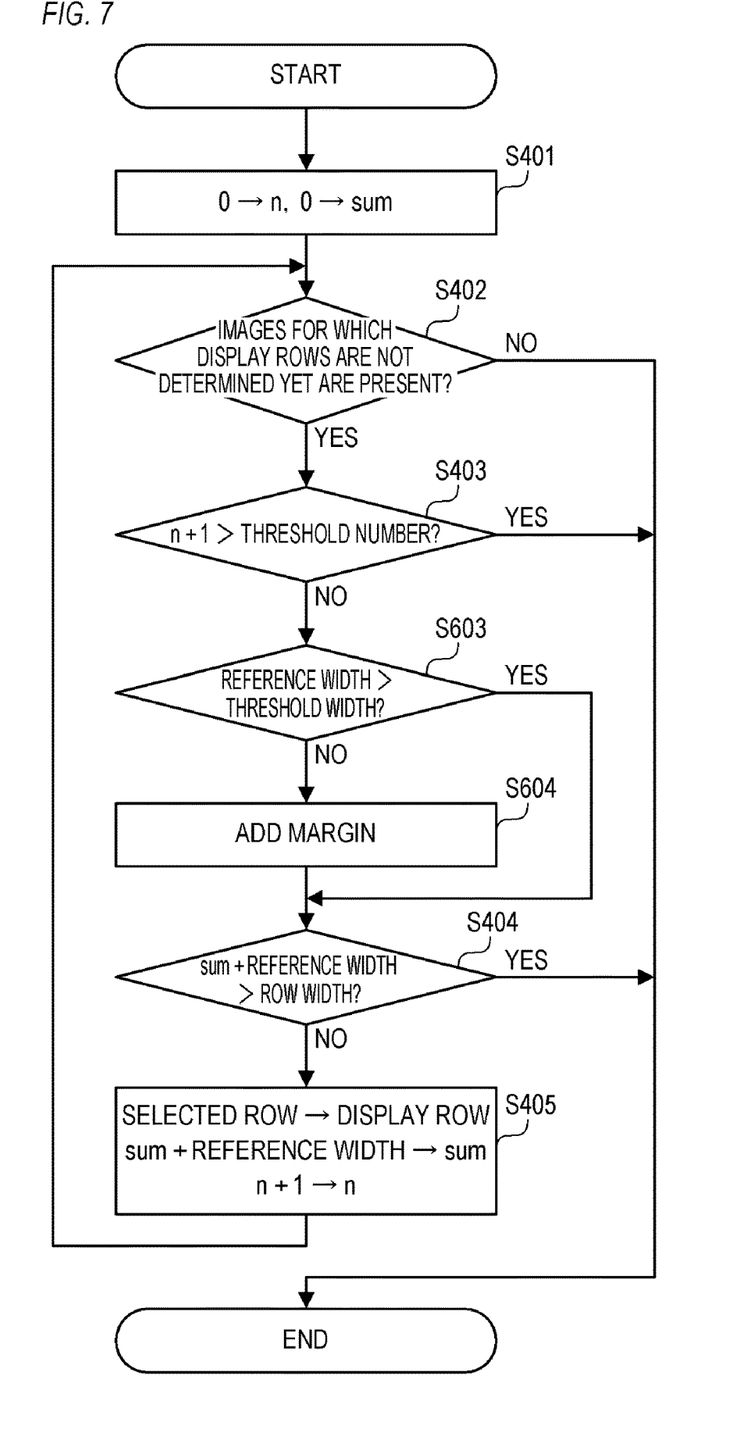
FIG. 7 is a flowchart showing a processing flow example according to a combination of the first and second embodiments.

For example, the configurations of the first and second embodiments may be combined to execute a processing flow of FIG. 7 as the processing flow in step S302 of FIG. 3. In FIG. 7, the same kinds of processing as those in FIGS. 4 and 6 are denoted by the same signs as the signs in FIGS. 4 and 6. In the processing flow of FIG. 7, kinds of processing in steps S603 and S604 are performed between the processing in step S403 and the processing in step S404. Consequently, for example, list display shown in FIG. 1E can be realized. In FIG. 1E, a longitudinally long image, a laterally long image having excessively large width, images preceding and following the laterally long image having excessively large width, and the like are displayed in appropriate sizes. The appearance of the images is further improved than in the first and second embodiments. By combining the first and second embodiments in this way, it is possible to prevent, in list display of images, display sizes of the images from becoming excessively large or becoming excessively small.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Therefore, a program code itself supplied to or installed in a computer in order to realize the functional processing of the present invention with the computer also realizes the present invention. That is, a computer program itself for realizing the functional processing of the present invention is also included in the present invention. In that case, the form of the program may be any form such as an object code, a program executed by an interpreter, and script data supplied to an OS so long as these have a function of a program. As a storage medium for supplying the program, for example, a magnetic storage medium such as a hard disk or a magnetic tape, an optical/magneto-optical storage medium, and a nonvolatile semiconductor memory can be used. As a method of supplying the program, it is also conceivable to adopt a method of recording (storing) a program forming the present invention on a server of a computer network and downloading the program from the server with a client computer connected to the computer network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-036329, filed on Mar. 1, 2018, which is hereby incorporated by reference herein in its entirety.

What is claimed is:

1. An electronic device capable of performing control such that a plurality of images are displayed in a display area side by side in a first direction and a second direction different from each other, the electronic device comprising:
   a processor; and
   a memory storing a program which, when executed by the processor, causes the electronic device to:
   calculate, for each of the plurality of images, length of a side in the first direction resized in order to maintain an aspect ratio when resizing length of a side in the second direction to a predetermined specific length;
   arrange the plurality of images in the first direction and the second direction such that the number of images arranged side by side in the first direction is not more than a threshold number and a total of lengths of sides in the first direction of the images arranged side by side in the first direction is not more than a threshold length;
   execute, for each of the images arranged side by side in the first direction, resize processing for resizing the images arranged side by side in the first direction such that the total of the lengths of the sides in the first direction of the images arranged side by side in the first direction is approximated to the threshold length and lengths of sides in the second direction of the images arranged side by side in the first direction are approximated; and
   display the images, on which the resize processing is executed, in the display area side by side in the first direction and the second direction;
   wherein at least one image among the plurality of images displayed in the display area has lengths of sides in the first direction different than lengths of sides in the first direction of another image among the plurality of images.

2. The electronic device according to claim 1, wherein the program, when executed by the processor, further causes the electronic device to not execute the resize processing on the images arranged side by side in the first direction when the images have reached a terminal end in the second direction.

3. The electronic device according to claim 1, wherein the program, when executed by the processor, further causes the electronic device to determine the threshold number by dividing the threshold length by an average of resized lengths of the sides in the first direction of the plurality of images.

4. The electronic device according to claim 1, wherein the program, when executed by the processor, further causes the electronic device to determine the threshold number according to user operation.

5. The electronic device according to claim 1, wherein the threshold length is length of a side in the first direction of the display area.

6. The electronic device according to claim 1, wherein the program, when executed by the processor, further causes the electronic device to add, to an image in which the resized length of the side in the first direction is larger than a threshold size, a margin in the first direction of the image such that the resized length of the side in the first direction is not more than the threshold size.

7. The electronic device according to claim 1, wherein the second direction is a direction perpendicular to the first direction.

8. The electronic device according to claim 1, wherein a part of the plurality of images is displayed in the display area, and the images displayed in the display area are changed by scrolling in the second direction.

9. The electronic device according to claim 1, wherein the plurality of images comprise longitudinally long images and laterally long image, the longitudinally long images being horizontal images that are wider than taller and the laterally long images being vertical images that are taller than wider.

10. The electronic device according to claim 1, wherein the predetermined specific length in the second direction is a fixed length for each of the plurality of images determined according to user operation.

11. The electronic device according to claim 1, wherein the predetermined specific length in the second direction is a fixed length of each of the plurality of images determined by the program executed by the processor.

12. The electronic device according to claim 1, wherein when the electronic device executes resize processing for each of the images arranged side by side in the first direction, aspect ratio of each of the images arranged side by side is maintained.

13. A display control method for displaying a plurality of images in a display area side by side in a first direction and a second direction different from each other, the display control method comprising:
   calculating, for each of the plurality of images, length of a side in the first direction resized in order to maintain an aspect ratio when resizing length of a side in the second direction to a predetermined specific length;
   arranging the plurality of images in the first direction and the second direction such that the number of images arranged side by side in the first direction is not more than a threshold number and a total of lengths of sides in the first direction of the images arranged side by side in the first direction is not more than a threshold length;
   executing, for each of the images arranged side by side in the first direction, resize processing for resizing the images arranged side by side in the first direction such that the total of the lengths of the sides in the first direction of the images arranged side by side in the first direction is approximated to the threshold length and lengths of sides in the second direction of the images arranged side by side in the first direction are approximated; and
   displaying the images, on which the resize processing is executed, in the display area side by side in the first direction and the second direction;
   wherein at least one image among the plurality of images displayed in the display area has lengths of sides in the first direction different than lengths of sides in the first direction of another image among the plurality of images.

14. A non-transitory computer readable medium that stores a program, wherein
   the program causes a computer to execute:
   calculating, for each of a plurality of images which are to be displayed in a display area side by side in a first direction and a second direction different from each other, length of a side in the first direction resized in order to maintain an aspect ratio when resizing length of a side in the second direction to a predetermined specific length;
   arranging the plurality of images in the first direction and the second direction such that the number of images arranged side by side in the first direction is not more than a threshold number and a total of lengths of sides in the first direction of the images arranged side by side in the first direction is not more than a threshold length;

executing, for each of the images arranged side by side in the first direction, resize processing for resizing the images arranged side by side in the first direction such that the total of the lengths of the sides in the first direction of the images arranged side by side in the first direction is approximated to the threshold length and lengths of sides in the second direction of the images arranged side by side in the first direction are approximated; and displaying the images, on which the resize processing is executed, in the display area side by side in the first direction and the second direction wherein at least one image among the plurality of images displayed in the display area has lengths of sides in the first direction different than lengths of sides in the first direction of another image among the plurality of images.

* * * * *